UNITED STATES PATENT OFFICE.

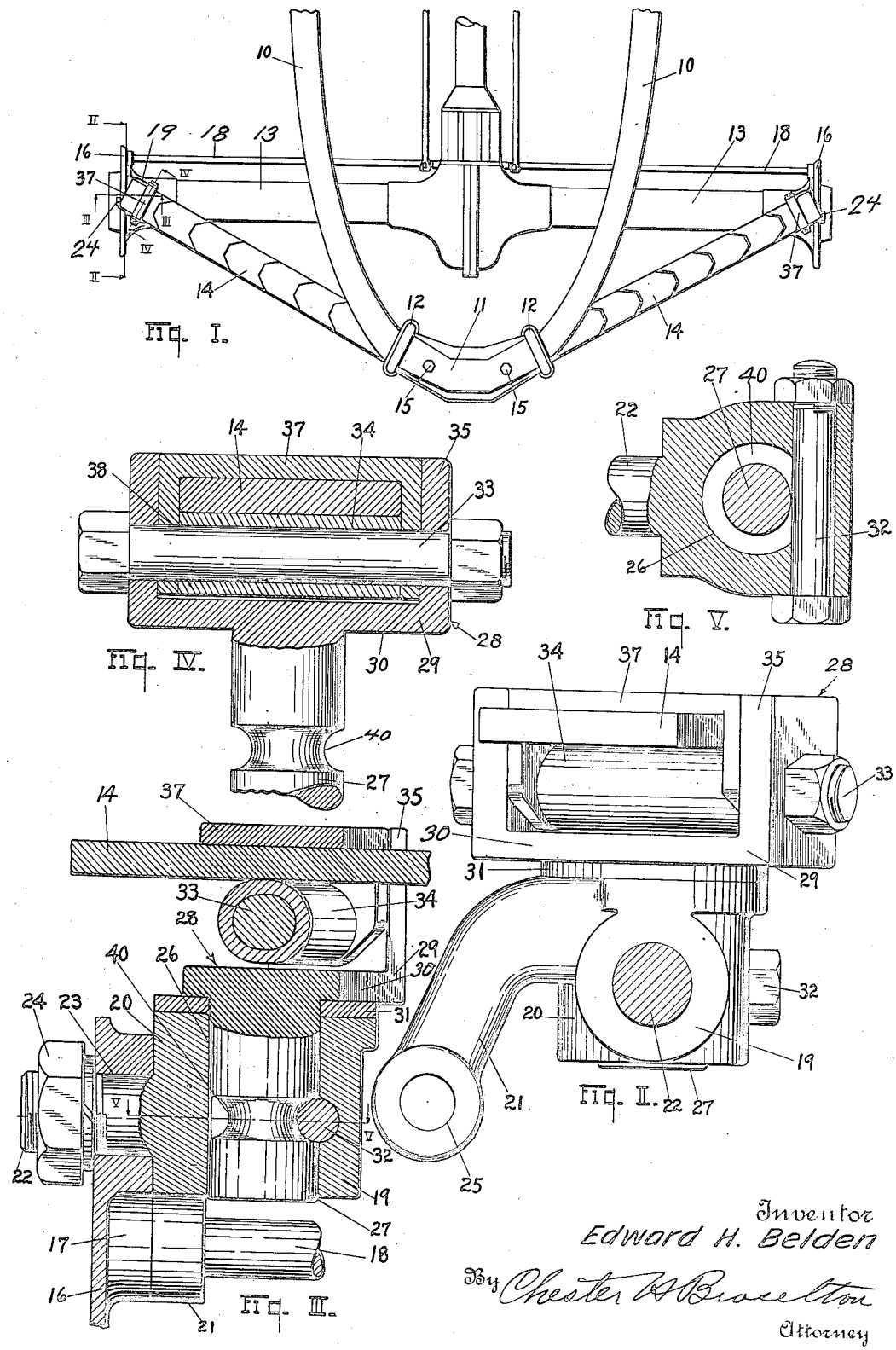

EDWARD H. BELDEN, OF TOLEDO, OHIO, ASSIGNOR, BY MESNE ASSIGNMENTS, TO THE WILLYS-OVERLAND COMPANY, OF TOLEDO, OHIO, A CORPORATION OF OHIO.

SPRING SUSPENSION FOR VEHICLES.

1,421,760.          Specification of Letters Patent.      Patented July 4, 1922.

Application filed January 13, 1919. Serial No. 270,885.

*To all whom it may concern:*

Be it known that I, EDWARD H. BELDEN, a citizen of the United States, residing at Toledo, county of Lucas, and State of Ohio, have invented certain new and useful Improvements in Spring Suspensions for Vehicles, of which I declare the following to be a full, clear, and exact description.

This invention relates to improvements in spring suspension for vehicles.

The principal object of this invention is to provide improved means for mounting vehicle springs on an axle, the improved means being of such a character that the various strains and frictional forces between each spring, the supporting means and the axle is reduced to a minimum and the resilient action of the spring is made more efficient, all of which is conducive to comfortable riding.

Further objects, and objects relating to economies of manufacture and details of construction, will definitely appear from the detailed description to follow.

I accomplish the objects of my invention by the devices and means described in the following specification. My invention is clearly defined and pointed out in the appended claims.

A structure constituting a preferred embodiment of my invention is illustrated in the accompanying drawing, forming a part of this specification, in which:

Figure I is a top plan view of the rear portions of a motor vehicle chassis embodying my invention.

Figure II is a detailed view in side elevation of the improved spring mounting means, the view being taken as on the line II—II of Figure I.

Figure III is a detailed sectional view, taken substantially on the line III—III of Figure I.

Figure IV is a detailed sectional view taken substantially on the line IV—IV of Figure I, and Figure V is a detailed, fragmentary, sectional view taken substantially on the line V—V of Figure III.

Considering the numbered parts of the drawing, the vehicle frame comprises two channel-shaped side members 10, the rear portions of which are bent or curved toward each other, the rear ends of the side members being connected together by a channel-shaped yoke 11 and shackle bolts 12 which embrace the yoke 11 and the side members 10. The frame is connected with the axle 13 and supported thereby by means of springs 14 which converge rearwardly from the axle 13 and toward the central longitudinal line of the frame. The inner ends of the springs are mounted in the channels of the channel members 10 and retained therein by means of the channel-shaped yoke 11, the shackle bolts 12 and additional bolts 15.

Mounted on each end of the axle 13 in the usual manner is a brake flange 16 which is provided with a boss 17, (Figure III), supporting the outer end of a brake operating rod 18. Mounted on each brake flange is a bracket 19 comprising a cylindrical portion 20 having a depending curved arm 21 (Figures II and III) and a horizontally extending screw threaded stud 22 which projects through an opening 23 in the brake flange, and is provided on its end with a nut 24 for holding the bracket 19 in place on the brake flange. The brake rod 18 projects through an opening 25 (Figure II) in the arm 21 to prevent rotation of the bracket 19 about the stud 22.

The cylindrical portion 20 of the bracket is provided with an opening 26 (Figures III and V) in which is mounted a spindle 27 forming an integral part of a yoke 28, comprising the spindle 27, and a U shaped member 29, a suitable washer 31 being mounted between the upper end of the cylindrical portion 20 and the horizontal portion 30 of the members of the yoke, to provide a suitable bearing. A bolt 32 projects horizontally through the portion 20 of the bracket 19 and is so positioned that part of its central portion extends into the opening 26 and into a circumferential groove 40 in the spindle 27, whereby the yoke 28 is free to rotate on the bracket 19 and the spindle 27 is prevented from moving axially relative to the bracket. A bolt 33 carrying a sleeve bearing 34 is mounted on the vertical arms 35 of the member 29. The arms of an inverted U-shaped member 37 are provided with openings 38 through which the bolt 33 projects, whereby the member 37 is pivotally mounted on the bolt.

The outer end of the longest leaf of the spring, which is the lowermost leaf, projects between the horizontal portion of the member 37 and the bearing sleeve 34 and is supported by the sleeve bearing, there being just sufficient clearance between the spring and the horizontal portion of the U-shaped member 37 to permit unretarded movement of the spring relative to this member.

From the above description it can be seen that the outer ends of the springs 14 are free to move relatively to their supporting means during the relative movement between the axle 13 and the vehicle frame, the ends of the spring being drawn slightly away from the brake drum when the vertical distance between the axle and the frame is increased, and being moved slightly toward the brake drum when the vertical distance between the axle and the frame is reduced. During such movements of the ends of the spring the bearing sleeves 34 upon which the ends of the spring rest rotate about the bolts 33, thereby greatly reducing the friction which would otherwise be present. The U-shaped members 37 retain the ends of the lower leaves of the respective springs on the bearing sleeves 34, and are mounted to rotate on the bolts 33 to permit the flexing of the outer ends of the springs during the up and down movement of the vehicle frame relative to the axle 13, whereby there is no binding between the springs and the members. It is apparent that in the usual constructions, in which the ends of the springs are fastened on the axle against movement relative thereto, the ends of the springs do not flex and they also tend to retard the flexing action of the remainder of the springs, whereas in the present construction the springs are free to flex from their points of connection to the vehicle frame to their outer ends, and the means supporting the outer ends of the springs do not retard the flexing action of any part of the springs.

The supporting yokes 29 are mounted for rotation on a vertical axis on the bracket 19 in order to accommodate the tendency of the springs to swing sidewise relative to the axle due to any relative movement between the ends of the spring and the yokes, and also to the various strains to which the spring and the support are subjected when the vehicle frame sways. The supports are, therefore, rotatable and the ends of the spring are mounted to move relatively to the support so that the various frictional forces are substantially overcome and the various strains are adequately provided for. As the outer ends of the springs are free to move relative to the supports, the flexing action of the springs is not retarded and, therefore, the efficiency of the springs is greatly increased. One important feature of this construction is that the outer ends of the springs, because of the relative arrangement of the springs and the axle, and the construction of the supporting means, are permitted to move relative to the supporting means and yet be retained therein without the necessity of modifying or changing the construction of the ends of the longest leaf as, for example, by having a slot in the leaf and a pin on the support extending through the slot to prevent it from being moved out of the supporting means.

I am aware that the particular embodiment of my invention, which I have here shown and described, is susceptible of considerable variation without departing from the spirit thereof and, therefore, I desire to claim my invention broadly, as well as specifically, as indicated by the appended claims.

Having thus described my invention, what I claim as new and desire to secure by Letters Patent, is:

1. In a vehicle, the combination of a frame, an axle, spring supporting means mounted on said axle for rotation on a vertical axis, and a spring slidably supported by said supporting means and connected to said frame.

2. In a vehicle, the combination of a frame, an axle, spring supporting means mounted on said axle for rotation in a horizontal plane, and a spring connected to the frame and having one end entirely slidably supported by said supporting means.

3. In a vehicle, the combination of a frame, an axle, a pair of springs each connected at one end to the frame, and means, one for each spring, mounted on the axle for rotation on a vertical axis for supporting the other end of the spring.

4. In a vehicle, the combination of a frame, an axle, a pair of springs, each connected at one end to said frame substantially in line with the mid-point of the axle and to one side thereof, and means pivoted on the axle for rotation on a vertical axis for supporting the other end of each spring.

5. In a vehicle, the combination of a frame, an axle, a pair of springs, each connected at one end to said frame substantially in line with the mid-point of the axle and to one side thereof, and means pivoted on the axle for slidably supporting the other end of each spring.

6. In a vehicle, the combination of a frame, an axle, spring supporting means mounted on said axle and including a bearing rotatable in a horizontal plane, and a spring connected to the frame and having one end supported on said bearing in such manner as to permit relative movement between the spring and the supporting means.

7. In a vehicle, the combination of a frame, an axle, spring supporting means pivotally mounted on said axle, a bearing mounted on said supporting means and rotatable in a substantially horizontal plane, and a spring connected to the frame and having one end supported by said bearing in such a manner as to permit relative movement between the supporting means and the spring.

8. In a vehicle, the combination of a frame, an axle, spring supporting means pivotally mounted on said axle for rotation on a vertical axis, a rotatable bearing mounted on said supporting means, and a spring connected to the frame and having one end supported by said bearing in such a manner as to permit relative movement between the supporting means and the spring.

9. In a vehicle, the combination of a frame, an axle, spring supporting means pivotally mounted on said axle, a rotatable bearing on said supporting means, and a spring connected to the frame and having one end supported by said bearing in such a manner as to permit relative movement between the supporting means and the spring.

10. In a vehicle, the combination of a frame, an axle, a pair of springs, each connected at one end to said frame substantially in line with the mid-point of the axle and to one side thereof, a device for each spring pivoted on said axle, and a rotatable sleeve on each device on which the other end of the respective spring is supported.

11. In a vehicle, the combination of a frame, an axle, a pair of springs, each connected at one end to said frame substantially in line with the mid-point of the axle and to one side thereof, a device for each spring pivoted on said axle for rotation on a vertical axis, and a rotatable sleeve on each device on which the other end of the respective spring is supported.

12. In a vehicle, the combination of a frame, an axle, a spring supporting means mounted on said axle for rotation on a vertical axis, a spring slidably supported by said supporting means and connected to said frame, and a pivot member on said supporting means for retaining said spring on said supporting means.

13. In a vehicle, the combination of a frame, an axle, a spring supporting means mounted on said axle for rotation in a horizontal plane, a spring slidably supported by said supporting means and connected to said frame, and a pivot member on said supporting means for retaining said spring on said supporting means.

14. In a vehicle, the combination of a frame, an axle, spring supporting means mounted on said axle and including a rotatable bearing, and a spring connected to the frame and having one end supported on said bearing to permit relative movement between the spring and the supporting means, and a pivoted member on said supporting means for retaining the end of said spring on the bearing.

15. In a vehicle, the combination of a frame, an axle, spring supporting means pivotally mounted on said axle, a rotatable bearing mounted on said supporting means, a spring connected to the frame and having one end supported on said bearing to permit relative movement between the supporting means and the spring, and a pivoted member on said supporting means for retaining the end of said spring on the bearing.

16. In a vehicle, the combination of a frame, an axle, a pair of springs each connected at one end of said frame substantially in line with the mid-point of the axle and to one side thereof, a device for each spring pivoted on said axle, a sleeve on each device on which the other end of the respective spring is supported, and a pivoted member on said device for retaining the end of the respective spring on the bearing.

17. In a vehicle, the combination of a frame, an axle, a pair of springs converging towards the central, longitudinal line of the frame and to one side of the axle, means for connecting the convergent ends of the spring to the frame, and a device for each spring pivoted on the axle and slidably supporting the entire outer end of the respective spring, the device being pivoted for rotation in a substantially horizontal plane.

18. In a vehicle, the combination of a frame, an axle, a pair of springs converging towards the central, longitudinal line of the frame and to one side of the axle, means for connecting the converging ends of the spring to the frame, a device for each spring pivoted on the axle and slidably supporting the other end of the spring, the device being pivoted for rotation on a vertical axis, and a pivoted member on said device for retaining the end of the respective spring in supported position.

19. In a vehicle, the combination of a frame, an axle, a pair of springs converging towards the central longitudinal line of the frame and to one side of the axle, means for connecting the converging ends of the springs to the frame, and a device for each spring pivoted on the axle for slidably supporting the other end of the spring, the springs being prevented from sliding longitudinally out of the supporting means because of the relative position of the axle and the springs.

20. In a vehicle, the combination of a frame, an axle, a pair of springs converging towards the central, longitudinal line of the frame and to one side of the axle, means connecting the converging ends of the springs to the frame, a device for each spring pivoted on the axle for slidably supporting the other end of the respective spring, a bearing member and a pivoted element on said device between which the other end of each spring is free to move longitudinally, the ends of the springs being prevented from moving out from between the respective bearing members and pivoted elements because of the relative position of the springs and axle.

21. In a vehicle, the combination of an axle, a frame, a spring between the axle and the frame, and a spring support on the axle comprising a bracket, a yoke pivoted on said bracket, a bearing member on said yoke upon which one end of the spring is supported, and an element pivoted on the yoke and engaging the spring to retain the spring on the said bearing member.

22. In a vehicle, the combination of an axle, a frame, a spring between the axle and the frame, and a spring support on the axle comprising a bracket, a yoke pivoted on the bracket for rotation on a vertical axis, a bearing member on said yoke upon which one end of the spring is supported, and an element pivoted on the yoke and engaging the spring to retain the spring on the bearing member.

23. In a vehicle, the combination of a frame, an axle, a spring between the axle and frame, and a spring support on the axle comprising a bracket, a yoke pivoted on the bracket, a rod carried by the yoke, a sleeve on the rod on which one end of the spring is supported, and an element pivoted on said rod and engaging the spring to retain the spring on the bearing sleeve.

24. In a vehicle, the combination of a frame, an axle, a spring between the axle and the frame, a flange on said axle, a bracket mounted on said flange, having a vertical opening, a yoke member having a depending spindle projecting into said opening with a circumferential groove, a pin on said bracket and projecting into said groove, and means on said yoke for supporting one end of said spring.

25. In a vehicle, the combination of an axle, a vehicle frame, a spring connected to the frame, means on the axle for slidably supporting one end of the spring, and a member for retaining the end of the spring on the supporting means, and movable relative to the supporting means by the flexing of the spring.

26. In a vehicle, a frame, an axle, a pair of cantilever springs rigidly secured at their large ends to the frame near the longitudinal center line thereof to one side of said axle and extending diagonally towards the axle, and means for attaching the opposite ends of the springs to the axle, said means comprising a bracket through which the corresponding spring is adapted to have a limited sliding movement.

In testimony whereof, I affix my signature.

EDWARD H. BELDEN.